(12) United States Patent
Nakano et al.

(10) Patent No.: US 11,186,795 B2
(45) Date of Patent: Nov. 30, 2021

(54) LOW FRICTION SLIDING MECHANISM

(71) Applicant: NISSAN MOTOR CO., LTD., Yokohama (JP)

(72) Inventors: Seiichi Nakano, Kanagawa (JP); Yutaka Mabuchi, Kanagawa (JP); Tsuyoshi Higuchi, Kanagawa (JP); Takemichi Yamashita, Kanagawa (JP); Hiroshi Tosaka, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 16/954,714

(22) PCT Filed: Dec. 28, 2017

(86) PCT No.: PCT/JP2017/047266
§ 371 (c)(1),
(2) Date: Jun. 17, 2020

(87) PCT Pub. No.: WO2019/130553
PCT Pub. Date: Jul. 4, 2019

(65) Prior Publication Data
US 2020/0385645 A1    Dec. 10, 2020

(51) Int. Cl.
*C10M 103/04* (2006.01)
*F16C 33/10* (2006.01)
*C10N 40/25* (2006.01)

(52) U.S. Cl.
CPC ....... *C10M 103/04* (2013.01); *F16C 33/1095* (2013.01); *C10M 2201/053* (2013.01); *C10N 2040/25* (2013.01)

(58) Field of Classification Search
CPC ........... C10M 103/04; C10M 2201/053; F16C 33/1095; F16C 2206/04; C10N 2040/25
See application file for complete search history.

(56) References Cited

U.S. PATENT DOCUMENTS

| | | | |
|---|---|---|---|
| 2004/0092405 A1* | 5/2004 | Konishi | C10M 163/00 508/110 |
| 2010/0009876 A1 | 1/2010 | Kamano et al. | |
| 2010/0129011 A1 | 5/2010 | Suga et al. | |
| 2010/0142872 A1* | 6/2010 | Egami | F16C 33/201 384/462 |

(Continued)

FOREIGN PATENT DOCUMENTS

| | | |
|---|---|---|
| EP | 1 510 594 A2 | 3/2005 |
| JP | 2001-165167 A | 6/2001 |

(Continued)

OTHER PUBLICATIONS

Kano et al., Friction Characteristics of Hard Carbon Film in Engine Oil (Second Report), Proceedings of the Japanese Society of Tribology, Tokyo, May 1999.

*Primary Examiner* — Ellen M McAvoy
(74) *Attorney, Agent, or Firm* — Foley & Lardner LLP (57) ABSTRACT

A sliding mechanism excellent in seizure resistance is provided. A sliding mechanism including a lubricating oil interposed at a sliding surface between a DLC coating sliding member (A) and a sliding member (B), wherein the DLC coating sliding member (A) has a DLC film covered on a base material, and metal films in an island configuration are covered on a surface of the DLC film.

8 Claims, 2 Drawing Sheets

(56) References Cited

U.S. PATENT DOCUMENTS

| | | | |
|---|---|---|---|
| 2011/0044572 A1* | 2/2011 | Kano | C23C 28/046 |
| | | | 384/625 |
| 2011/0143976 A1* | 6/2011 | Ito | C23C 14/024 |
| | | | 508/109 |
| 2013/0017412 A1* | 1/2013 | Suzuki | C23C 16/515 |
| | | | 428/702 |
| 2013/0237463 A1 | 9/2013 | Yagishita | |
| 2013/0309522 A1 | 11/2013 | Ito et al. | |
| 2015/0203777 A1* | 7/2015 | Ramm | C23C 14/0676 |
| | | | 508/103 |
| 2016/0341249 A1* | 11/2016 | Yang | C22C 45/04 |
| 2016/0348545 A1* | 12/2016 | Izawa | F01L 3/14 |
| 2017/0016480 A1* | 1/2017 | Rittmann | B32B 15/015 |
| 2017/0081522 A1* | 3/2017 | Adam | C09D 7/61 |
| 2019/0112546 A1* | 4/2019 | Moody | C10M 145/28 |

FOREIGN PATENT DOCUMENTS

| | | |
|---|---|---|
| JP | 2002-323045 A | 11/2002 |
| JP | 2005-098495 A | 4/2005 |
| JP | 2007-321860 A | 12/2007 |
| JP | 2008-164097 A | 7/2008 |
| JP | 2011-057766 A | 3/2011 |
| JP | 5167140 B2 | 3/2013 |
| JP | 2016-216653 A | 12/2016 |
| JP | 2017-115040 A | 6/2017 |
| WO | WO 2008/111617 A1 | 9/2008 |
| WO | WO-2011/072664 A1 | 6/2011 |

\* cited by examiner

LOW FRICTION SLIDING MECHANISM

TECHNICAL FIELD

The present invention relates to a low friction sliding mechanism, and more specifically relates to a low friction sliding mechanism that can improve friction characteristics or seizure resistance performance of various sliding surfaces in internal combustion engines, driving system transmission engines, etc, for example.

BACKGROUND ART

Global-scale environmental issues such as the warming of the whole earth and the depletion of the ozone layer have been getting a great deal of attention; in particular, $CO_2$ reduction, which has been said to greatly influence the warming of the whole earth, has been attracting great interest in various countries over how to determine the regulation value.

For $CO_2$ reduction, achieving a reduction in energy loss due to friction loss of machinery, equipment, etc., particularly a reduction in automotive fuel efficiency, has been a great issue; thus, a sliding mechanism plays a large role.

A role of the sliding mechanism is to provide excellent seizure resistance and a low coefficient of friction to parts of sliding members of an engine where friction-abrasion environment is severe; these days, use of various hard thin film materials has been advanced. In common DLC (diamond-like carbon) materials, a coefficient of friction in air in the absence of a lubricating oil is lower than a hard covering film material having abrasion resistance such as TiN and CrN; thus, DLC materials hold promise as a low friction sliding material.

On the other hand, it has been reported that a friction reduction effect of common DLC materials excellent in low friction characteristics is small in the presence of a lubricating oil (for example, Non-Patent Literature 1).

Here, Patent Literature 1 discloses that a friction reduction effect in a sliding mechanism can be improved by combining a common DLC material and an organic molybdenum compound.

CITATION LIST

Patent Literature

Non-Patent Literature 1: Kano, et al., Proceedings of the Japanese Society of Tribology, Tokyo, May 1999, pp 11-12
Patent Literature 1: JP 2005-098495 A

SUMMARY OF INVENTION

Technical Problem to be Solved by the Invention

As described above, the Patent Literature 1 above states that the sliding mechanism described in the literature exhibits an excellent friction reduction effect. However, a study by the present inventors has revealed that seizure resistance is not sufficient in the sliding mechanism disclosed in Patent Literature 1.

Thus, an object of the present invention is to provide a sliding mechanism excellent in seizure resistance.

Means to Solve the Problem

The present inventors have conducted extensive research in order to solve the issue mentioned above. As a result, the present inventors have found out that the issue mentioned above can be solved by employing a sliding mechanism including a DLC coating sliding member (A) in which a base material is covered with a DLC film, a sliding member (B), and a lubricating oil interposed at a sliding surface between the DLC coating sliding member (A) and the sliding member (B), in which metal films are independently present on the surface of the DLC film included in the DLC coating sliding member (A), thus, have completed the present invention.

That is, an aspect of the present invention relates to a sliding mechanism including a DLC coating sliding member (A) in which a base material is covered with a DLC film, a sliding member (B), and a lubricating oil interposed at a sliding surface between the DLC coating sliding member (A) and the sliding member (B). Then, the sliding mechanism is configured such that metal films are independently disposed on a surface of the DLC film included in the DLC coating sliding member (A) of the sliding mechanism.

Effects of the Invention

According to the present invention, a sliding mechanism excellent in seizure resistance can be obtained.

DESCRIPTION OF EMBODIMENTS

According to an aspect of the present invention, is provided a sliding mechanism which comprises a DLC coating sliding member (A) having a base material covered with a DLC film, a sliding member (B), and a lubricating oil interposed at a sliding surface between the DLC coating sliding member (A) and the sliding member (B), in which metal films are independently scattered on a surface of the DLC film constituting the DLC coating sliding member (A). By such a structure, a sliding mechanism with improved seizure resistance performance can be obtained. A detailed mechanism whereby the present invention exhibits the effect mentioned above is unclear, but is speculated as follows. It should be noted that the technical scope of the present invention is not limited to the mechanism mentioned below.

A study by the present inventors has found out that by distributing (dispersing) a large number of metal films, each of which uses a metal as a main component and is independent of the surroundings, in islands on a surface of a DLC film constituting a DLC coating sliding member (A), load upon the occurrence of seizure in sliding under high contact pressure tends to be considerably increased, as compared to a sliding mechanism using a conventional DLC coating sliding member not having such a configuration. As a cause of the exhibition of such a tendency, the present inventors have speculated that a large number of independent metal films dispersed on the surface of the inactive DLC film might function as a reaction site of an additive in a lubricating oil (for example, engine oil). Further, the present inventors have speculated that a large number of independent metal films dispersed on the surface of the DLC film might further contribute to cooling of contact points and to supply of an additive to be reacted, and further might serve to improve oil retainability of the entire sliding part, without inhibiting flow of the lubricating oil interposed between the sliding members (at a sliding surface). It is presumed that a significant effect of improving seizure resistance can be attained by a complex mechanism of these.

The sliding mechanism according to the present embodiment is not limited as long as it can have a structure like the above, and can be used for, for example, sliding parts like the following.

That is, the sliding mechanism can be used for sliding parts of internal combustion engines such as four-cycle engines and two-cycle engines (for example, valve mechanism systems, pistons, piston rings, piston skirts, cylinder liners, connecting rods, crankshafts, bearings, pillow blocks, metals, gears, chains, belts, oil pumps, etc.) as typical uses, sliding parts of driving system transmission mechanisms (for example, gears, etc.) and hard disk drives, and various other sliding surfaces where friction condition is severe and low friction properties are required.

Hereinbelow, the sliding mechanism according to the present embodiment will be described in more detail with reference to the appended drawings; however, the technical scope of the present invention should be established on the basis of the description of the scope of claims, and is not limited to the following embodiments. Note that, in the present specification, "X to Y" indicating a range means "more than or equal to X and less than or equal to Y". Further, unless otherwise stated, operation and the measurement of physical properties, etc. are performed under conditions of room temperature (20 to 25° C.) and a relative humidity of 40 to 50%.

Figure 1:
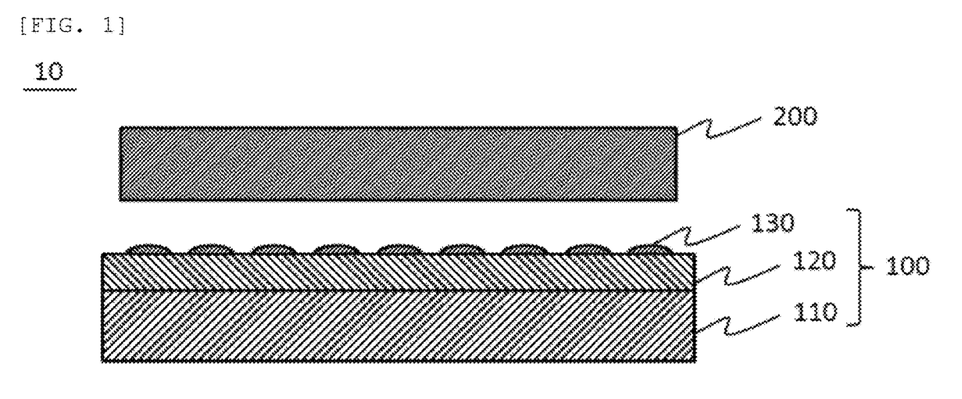
FIG. 1 is a cross-sectional view of a sliding mechanism according to an embodiment of the present invention.

FIG. 1 is a cross-sectional view of a sliding mechanism according to an embodiment of the present invention. As shown in FIG. 1, a sliding mechanism 10 according to the present embodiment includes a DLC coating sliding member (A) 100, a sliding member (B) 200 that is a counter member of sliding, and a lubricating oil (not illustrated) interposed between these members (at a sliding surface). The DLC coating sliding member (A) 100 includes a base material 110 and a DLC film 120 placed on the base material, as essential constituent members. Then, a large number of independent metal films 130 are disposed on a surface of the DLC film 120.

(DLC Coating Sliding Member (A))
<Base Material>

The DLC coating sliding member (A) in the present invention has a configuration in which a base material is covered with a DLC film. Further, metal films are independently scattered on the surface of the DLC film.

In the present embodiment, as the base material included in the DLC coating sliding member (A), a material formed of a metal member such as a high purity iron member, a high purity aluminum member, or a high purity titanium member, or further an iron alloy member of stainless steel (steel material) or the like, a copper alloy member, an aluminum alloy member, a magnesium alloy member, or a titanium alloy member may be used. Furthermore, also base materials formed of resin members of various kinds of rubber, plastic, or the like, or non-metal members such as ceramic members or carbon members may be used. In particular, an iron alloy member, an aluminum alloy member, and a magnesium alloy member are preferable in that they are easily used for sliding parts of existing machinery, equipment, etc. and further can make contributions to energy saving measures widely in various fields. Furthermore, also a member in which any of these metal members and non-metal members is covered with various thin film coatings is useful. Examples thereof include a member in which an iron alloy member, an aluminum alloy member, a magnesium alloy member, a titanium alloy member, or the like is covered with a thin film coating of titanium nitride (TiN), chromium nitride (CrN), or the like.

As the iron alloy member, for example, an iron-based alloy containing, as an alloy element, nickel, copper, zinc, chromium, cobalt, molybdenum, lead, silicon, or titanium, or an arbitrary combination of these is preferably used. For example, high carbon chromium bearing steel (specified as SUJ2 in JIS G4805), alloy tool steel, carburized steel, low alloy chilled cast iron, tempered carbon steel, hardened steel, and the like may be used. Specifically, nickel chromium steel (SNC415 and SNC815), nickel chromium molybdenum steel (SNCM220, SNCM415, SNCM420, SNCM616, and SNCM815), chromium steel (SCr415 and SCr420), chromium molybdenum steel (SCM415, SCM418, SCM420, SCM421, and SCM822), manganese steel (SMn420), and manganese chromium steel (SMnC420) specified in JIS, and the like may be given; but the iron alloy member is not limited thereto.

Further, a surface hardness of the iron member or the iron alloy member is preferably HRC 45 to 60 in Rockwell hardness (C scale). This case is effective because durability of a hard carbon layer can be maintained even under sliding conditions of a high contact pressure of approximately 700 MPa like in, for example, a cam follower member. If the surface hardness is less than HRC 45, a member may be likely to buckle and peel under high contact pressure.

Furthermore, a surface roughness of the iron member or the iron alloy member is preferably less than or equal to 0.1 μm as an arithmetic mean roughness Ra, in terms of stability of sliding. If the surface roughness is more than 0.1 μm, scuffing may be formed locally, to considerably increase coefficient of friction.

Further, as the aluminum alloy member, for example, hypoeutectic aluminum alloy containing silicon (Si) at 4 to 20 mass % and copper (Cu) at 1.0 to 5.0 mass % or hypereutectic aluminum alloy is preferably used. Specifically, AC2A, AC8A, ADC12, and ADC14 specified in JIS, and the like may be given.

Further, a surface hardness of the aluminum member or the aluminum alloy member is preferably HB 80 to 130 in Brinell hardness. If the surface hardness of the aluminum member or the aluminum alloy member is outside the range mentioned above, the aluminum member or the aluminum alloy member may be likely to be worn away at less than HB 80.

Furthermore, a surface roughness of the aluminum member or the aluminum alloy member is preferably less than or equal to 0.1 μm as an arithmetic mean roughness Ra, in terms of stability of sliding. If the surface roughness is more than 0.1 μm, scuffing may be formed locally, to considerably increase coefficient of friction.

Further, as the magnesium alloy member, for example, a member using a magnesium-aluminum-zinc (Mg—Al—Zn)-based material, a magnesium-aluminum-rare-earth-metal (Mg—Al-REM)-based material, a magnesium-aluminum-calcium (Mg—Al—Ca)-based material, a magnesium-zinc-aluminum-calcium (Mg—Zn—Al—Ca)-based material, a magnesium-aluminum-calcium-rare-earth-metal (Mg—Al—Ca-REM)-based material, a magnesium-aluminum-strontium (Mg—Al—Sr)-based material, a magnesium-aluminum-silicon (Mg—Al—Si)-based material, a magnesium-rare-earth-metal-zinc (Mg-REM-Zn)-based material, a magnesium-silver-rare-earth-metal (Mg—Ag-REM)-based material, or a magnesium-yttrium-rare-earth-metal (Mg—Y-REM)-based material, or an arbitrary combination of these is preferably used. Specifically, AZ91, AE42, AX51, AXJ, ZAX85, AXE522, AJ52, AS21, QE22, and WE43 specified in ASTM, and the like may be given.

Further, a surface hardness of the magnesium member or the magnesium alloy member is preferably HB 45 to 95 in Brinell hardness. If the surface hardness of the magnesium member or the magnesium alloy member is outside the range mentioned above, the magnesium member or the magnesium alloy member may be likely to be worn away at less than HB 45.

Furthermore, a surface roughness of the magnesium member or the magnesium alloy member is preferably less than or equal to 0.1 μm as an arithmetic mean roughness Ra, in terms of stability of sliding. If the surface roughness is more than 0.1 μm, scuffing may be formed locally, to considerably increase coefficient of friction.

<DLC Film>

In the present embodiment, the DLC (diamond-like carbon) film disposed on the base material of the sliding member (A) is an amorphous film mainly made of a carbon element. In a microstructure of DLC, a bonding form of carbon atoms is composed of both a diamond structure ($sp^3$ bond(s)) and a graphite bond(s) ($sp^2$ bond(s)). Specifically, as specific examples of an amorphous structure in which the bonding form of carbon atoms includes both a diamond structure ($sp^3$ bond(s)) and a graphite structure ($sp^2$ bond(s)), amorphous carbon (a-C) formed only of a carbon element (containing no hydrogen), hydrogen amorphous carbon (a-C:H) containing hydrogen, metal amorphous carbon (MeC) partially containing a metal element such as titanium (Ti) or molybdenum (Mo), and the like may be given.

The DLC film can be formed on the base material by a method such as a CVD method or a PVD method. In general, when a DLC film is formed using a CVD method such as a thermal CVD method or a plasma CVD method, hydrogen derived from an organic compound (for example, a hydrocarbon gas) as a raw material is contained in the DLC film, and a hydrogen concentration in the DLC film is typically 15 to 40 atomic %. On the other hand, a PVD method such as an ion plating method, an arc ion plating method, a laser ablation method, a sputtering method, or a magnetron sputtering method using a carbon beam can make control such that hydrogen is contained or is not contained. The smaller a content of hydrogen in the DLC film is, the more friction reduction effect can be obtained, and furthermore the more excellent seizure resistance performance can be ensured. From such a point of view, a content of hydrogen in the DLC film is preferably less than or equal to 40 atomic %, more preferably less than or equal to 25 atomic %, still more preferably less than or equal to 10 atomic %, particularly preferably less than or equal to 5 atomic %, and most preferably less than or equal to 1 atomic %. In particular, hydrogen amorphous carbon (a-C:H) containing hydrogen at less than or equal to 1 atomic % and more than 0 atomic % or amorphous carbon (a-C) containing no hydrogen is preferable. Note that, from the viewpoint of mainly reducing a content of hydrogen of the outermost layer of the DLC film, the DLC film may have a multiple-layer structure of two or more layers, and the outermost layer may be formed of hydrogen amorphous carbon (a-C:H) with a hydrogen concentration of less than or equal to 1 atomic % and more than 0 atomic %, or amorphous carbon containing no hydrogen. Here, "the outermost layer" refers to an area extending 5% from the outermost surface with a thickness of the DLC film as a standard (100%), and representatively refers to an area extending 1.0 μm in depth from the outermost surface. Note that, in the case where the DLC film has a single-layer structure, this layer is regarded as the outermost layer.

Furthermore, a surface roughness in a sliding part of the DLC film is, as an arithmetic mean roughness Ra, preferably less than or equal to 0.1 μm, more preferably less than or equal to 0.08 μm, still more preferably less than or equal to 0.05 μm, and particularly preferably less than or equal to 0.03 μm. If the surface roughness is more than 0.1 μm as the arithmetic mean roughness Ra, scuffing may be formed locally, to increase coefficient of friction. Since it is preferable that the surface be as smooth as possible, the lower limit of the roughness is not particularly set; however, in practice, finishing may be performed into a surface with an appropriate roughness like that described above while the cost of manufacturing and processing is taken into account, as appropriate. Note that a surface roughness of less than or equal to 0.08 μm as the arithmetic mean roughness Ra is preferable in terms of stability of sliding.

<Metal Film>

In the sliding mechanism according to the present embodiment, independent metal films are interspersed on the surface of the DLC film constituting the sliding member (A), as described above. It is presumed that the metal films thus interspersed on the surface of the DLC film would further contribute to cooling of a contact point and to supply of an additive to be reacted, and further would function to improve oil retainability of an entire sliding part, without inhibiting flow of the lubricating oil interposed between the sliding members (at a sliding surfaces). Then, it is presumed that, as a result, the metal films would contribute to improvement in seizure resistance of the sliding mechanism.

The metal film is not particularly limited as long as it is a film containing a metal as a main component, and may be formed of a metal that does not give ugly influence to function as the sliding mechanism. In a preferred embodiment, the metal film is a metal film having at least one metal selected from the group consisting of copper, aluminum, iron, and tin as a main component. Here, "having a metal as a main component" refers to containing a metal as a main component, and is a concept including both of being made only of metal and being substantially made of metal. Depending on the circumstances, for example, a material other than metal may be contained in terms of the manufacturing process. Note that "substantially made of metal" means that contamination of other materials at less than or equal to approximately 10 mass % (preferably less than or equal to approximately 5 mass %, and more preferably less than or equal to approximately 1 mass %) can be permitted.

Further, in the present embodiment, "metal films are independently interspersed" on the surface of the DLC film means that covering parts of a large number of metal films each existing in a state of being apart from adjacent metal films (that is, in a discontinuous manner) exist in a dotted configuration (or in islands) on the surface of the DLC film. In other words, a surface of the DLC film not covered with the metal film is exposed continuously. Note that a size and a pattern of shape of the metal film are not particularly limited.

A ratio of area (area ratio) of metal films in the surface of the DLC film is not particularly limited, but the lower limit is preferably more than or equal to 1%, more preferably more than or equal to 5%, and still more preferably more than or equal to 10%. By the area ratio of metal films being high, cooling of a sliding part and oil retainability of an entire sliding mechanism can be enhanced, and friction reduction effect or seizure resistance performance can be improved. On the other hand, the upper limit of the area ratio of metal films is preferably less than or equal to 50%, more preferably less than or equal to 40%, and still more preferably less than or equal to 30%. When the area ratio of metal films is within such ranges, the interspersed state of independent metal films can be ensured, and sites where an additive reacts can be obtained.

In the present embodiment, a thickness of the metal film is not particularly limited either, but the lower limit is preferably more than or equal to 0.1 µm, more preferably more than or equal to 0.3 µm, and still more preferably more than or equal to 0.5 µm. Within such ranges, the independent metal films interspersed on the surface of the DLC film can improve oil retainability of an entire sliding part. Note that the upper limit of the thickness of the metal film is not particularly limited either, but is preferably less than or equal to 10 µm, more preferably less than or equal to 1 µm, and still more preferably less than or equal to 0.9 µm. Within such ranges, an increase in coefficient of friction due to the metal films in islands can be suppressed.

In the present embodiment, a method for causing the DLC film to be covered with independent metal films in an interspersed manner is not particularly limited. For example, independent metal films can be formed in an interspersed manner by combining a vapor deposition method, a sputtering method, or a CVD method and photolithography, or the like. As an example, a metal film is deposited so as to be in contact with the DLC film by a vapor deposition method, a sputtering method, a CVD method, or the like. A photoresist film is applied on the metal film, and the photoresist film is patterned by photolithography technology such that portions to remain are in islands. Parts of the metal film are selectively removed by etching using the patterned photoresist film as a mask, to form a large number of independent metal films.

Furthermore, according to a preferred embodiment of the present invention, a method in which a sliding member (A') covered with a DLC film as a precursor of a DLC coating sliding member (A) and a sliding member (B) described later are combined such that a sliding mechanism is configured and then metal films are formed on the DLC film of the sliding member (A') may be provided. Specifically, in a method including (1) a step of combining a sliding member (A') in which a base material is covered with a DLC film and a sliding member (B) containing a metal material to fabricate a sliding mechanism, and (2) a step of applying a lubricating oil containing a molybdenum-containing compound to a sliding part of the sliding mechanism to reciprocate between the sliding member (A') and the sliding member (B), metal films of the same kind as the metal material contained in the sliding member (B), which is a counter member, can be independently interspersed on a sliding part of the sliding member (A') (a surface of the DLC film). That is, a sliding member (A) is obtained in this way. Although a detailed cause thereof is not clear, it has been found that a sliding mechanism including a sliding member (A) in which a surface of a DLC film is covered with metal films is fabricated by the method mentioned above and the sliding mechanism has excellent friction reduction ability and seizure resistance performance.

Further, in the case where a large number of independent (island-shaped) metal films are formed by combining the vapor deposition method, the sputtering method, or the CVD method with photolithography, any sliding member (B) as a counter member of the sliding member (A) and any lubricating oil may be employed without limitations as long as they are within ranges like those described below. On the other hand, in the case where a large number of independent metal films are formed by a method including the steps of (1) and (2) mentioned above, the sliding member (B) is required to contain a metal material as a main component and the lubricating oil is required to contain a molybdenum-containing compound. By such a specific combination, metal films of the same kind as the metal contained in the sliding member (B) can be distributed on the surface of the DLC film independently (in islands). Thus, also a method of manufacturing a sliding member (A) comprising the steps of (1) and (2) mentioned above is provided as an embodiment of the present invention. In this manufacturing method, the metal material contained in the sliding member (B) is preferably at least one member selected from the group consisting of copper, aluminum, iron, and tin. In particular, the constituent material of the sliding member (B) is more preferably copper in view of compatibility with the lubricating oil. That is, it is more preferable that, in the DLC coating sliding member (A), a large number of metal films independently interspersed have copper as a main component. Note that, in this manufacturing method, the lubricating oil contains a molybdenum-containing compound, and a molybdenum-containing compound such as molybdenum dithiocarbamate (MoDTC) or molybdenum dithiophosphate (MoDTP) is particularly preferably used, from the viewpoint of easy acquisition. The sliding member (B) and the lubricating oil will be further described in detail below.

In the case of forming a large number of independent metal films by a method including the steps of (1) and (2) mentioned above, an area ratio of metal films in the surface of the DLC film can be controlled by adjusting a content of the molybdenum-containing compound in the lubricating oil. Specifically, preferred ranges of the content of the molybdenum-containing compound in the lubricating oil will be given in the following description on the lubricating oil; the area ratio of metal films can be increased when the content of the molybdenum-containing compound in the lubricating oil is increased within these preferred ranges.

Furthermore, in the case forming a large number of independent metal films by a method including the steps of (1) and (2) mentioned above, an interspersed state of metal films can be found by observing a sliding part with a cross-sectional scanning electron microscope (SEM). Further, a component of the metal film can be found by elemental analysis using a combustion method.

(Sliding Member (B))

A constituent material of a counter member (in the present invention, also referred to as a sliding member (B)) that slides with the DLC coating sliding member (A) mentioned above is not particularly limited, and examples thereof include metal materials such as iron-based materials, copper-based materials, aluminum-based materials, magnesium-based materials, titanium-based materials, and tin-based materials, etc. Further, also non-metal materials such as resins, plastics, and carbon may be used. Further, these metal materials and non-metal materials may be provided with various thin film coatings. In particular, copper-based materials, iron-based materials, aluminum-based materials, and tin-based materials are preferable in that they are easily used for a sliding part of existing machinery, equipment, etc. and further can make contributions to energy saving measures widely in various fields. Furthermore, as described above, metal films can be formed in an interspersed manner while the sliding mechanism slides by employing, in a method for forming a large number of independent metal films on the surface of the DLC film of the DLC coating sliding member (A), a member using as a main component at least one metal selected from the group consisting of copper, aluminum, iron, and tin as the sliding member (B) as a counter member, which method is efficient in terms of the manufacturing process, and is preferable.

The copper-based material mentioned above is not particularly limited, and not only high purity copper but also various copper-based alloys (alloys containing nickel, iron, zinc, chromium, cobalt, molybdenum, lead, silicon, titanium, or tin, or an arbitrary combination of these elements) may be used. Specific examples thereof include bronze alloy (copper-tin alloy) and the like.

The iron-based material mentioned above is not particularly limited, and not only high purity iron but also various iron-based alloys (alloys containing nickel, copper, zinc, chromium, cobalt, molybdenum, lead, silicon, titanium, or tin, or an arbitrary combination of these elements) may be used. Specific examples thereof include carburized steel SCM420, SCr420 (JIS), and the like.

Further, the aluminum-based material mentioned above is not particularly limited either, and various aluminum-based alloys may be used as well as high purity aluminum. Specifically, it is desirable to use, for example, hypoeutectic aluminum alloy containing silicon (Si) at 4 to 20% and copper (Cu) at 1.0 to 5.0%, hypereutectic aluminum alloy, or the like. Preferred examples of aluminum alloy include AC2A, AC8A, ADC12, and ADC14 (JIS), and the like.

The metal material provided with a coating is not particularly limited; specifically, a metal-based material in which a surface of any of various metal-based materials is provided with a thin film coating of TiN, CrN, or the like, or the DLC material mentioned above or the like may be given.

(Lubricating Oil)

In the sliding mechanism according to the present embodiment, a lubricating oil is caused to exist in the sliding part.

The lubricating oil that can be used in the present embodiment is not particularly limited, and examples thereof include automotive engine oil and transmission oil.

As a means for improving friction reduction or seizure resistance performance by the lubricating oil, reducing a viscosity to reduce viscosity-resistance in a fluid lubrication region and stirring-resistance in an engine, and blending an optimum friction adjusting agent and various additives to reduce friction loss in a mixed and boundary lubrication region may be cited. From such a point of view, for a viscosity (the SAE viscosity grade) of the lubricating oil, a viscosity at a low temperature is preferably less than or equal to 25 W, more preferably less than or equal to 15 W, and still more preferably less than or equal to 5 W. Further, a viscosity at a high temperature is preferably less than or equal to 60, more preferably less than or equal to 40, and still more preferably less than or equal to 20. As the friction adjusting agent, a molybdenum-containing compound such as molybdenum dithiocarbamate (MoDTC) or molybdenum dithiophosphate (MoDTP) may be used. As described above, by incorporating a molybdenum-containing compound in the lubricating oil, metal films can be formed on the surface of the DLC film included in the sliding member (A) while the sliding mechanism slides; this method is efficient in terms of the manufacturing process, and is preferable. Furthermore, a study by the present inventors has also found that $MoS_2$ and $MoO_3$ are generated in the case where a lubricating oil containing a molybdenum-containing compound is used for a sliding mechanism. It is presumed that $MoS_2$ formed in this way contributes to friction reduction and $MoO_3$ contributes to improvement in seizure resistance; thus, this method can contribute also to the solution of the issue of the present invention.

A content of molybdenum (on an atomic basis) in the lubricating oil according to the present embodiment is preferably more than or equal to 10 mass ppm, more preferably more than or equal to 100 mass ppm, and still more preferably more than or equal to 500 mass ppm, with respect to a total amount of the lubricating oil. Within such ranges, friction reduction effect can be conspicuously attained. Further, the upper limit of the content of molybdenum is not particularly limited either; however, when the content of molybdenum is less than or equal to 1,000 mass ppm, solubility in the lubricating oil and storage stability are good, and precipitates are less likely to occur; thus, such a range is preferable.

Note that, in the lubricating oil of the present invention, various additives such as an ashless dispersant, an anti-abrasion agent or an extreme pressure agent, a metal-based cleaning agent, an antioxidant, a viscosity index improver, a friction adjusting agent other than the molybdenum-containing compound, an antirust agent, a nonionic surfactant, a demulsifier, a metal deactivator, and an antifoaming agent may be further blended singly or in combination of a plurality of kinds; thus, necessary performance can be enhanced.

EXAMPLES

The present invention will now be described in still more detail using the following Examples. However, the technical scope of the present invention is not limited to the following Examples.

Figure 2:
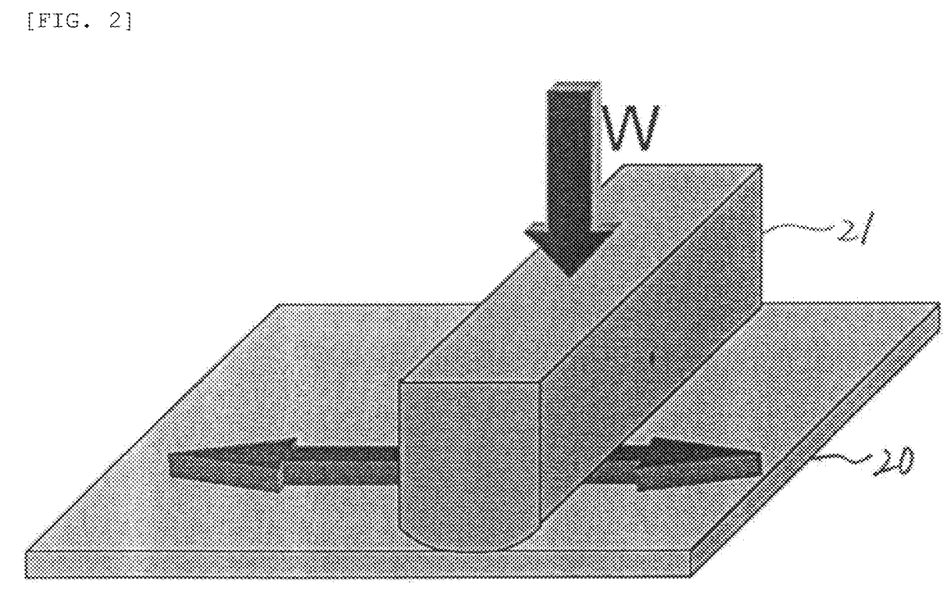
FIG. 2 is a schematic perspective view showing a principal part of a testing machine for reciprocating a test piece.

In the following Examples, a sliding test (a reciprocal motion test) was performed using equipment shown in FIG. 2, to confirm the effects of the present invention. FIG. 2 is a schematic perspective view showing a principal part of a testing machine for reciprocating a test piece. The test was performed by, as shown in FIG. 2, making reciprocal sliding in the direction of the double-pointed arrow in a state where a vertical load was applied to a pin test piece (corresponding to the DLC coating sliding member (A)) 21 on a flat plate test piece 20 (corresponding to the sliding member (B)). Note that each of Examples and Comparative Examples was performed by changing any of a material of the flat plate test piece 20 or the pin test piece, a composition of the lubricating oil, and a method for forming metal films. Further, a load was applied while being increased over time, and was set so as to stop when a frictional force in the sliding part exceeded 130 N (regarded as the time point when seizure began to occur excessively).

Specific test conditions, etc. are as follows.

Testing machine: SRV Test (a reciprocal motion friction testing machine)

Test Conditions

Temperature: 120° C. for the flat plate test piece

Step UP: 200 N/3 min, 0.7 m/s

<Sliding: 20 mm×2 (reciprocal motions), 1000 cpm>

Lubrication state: Wet (1 drop of lubricating oil was applied)

Example 1

Materials of the flat plate test piece and the pin test piece used in the present Example are as follows.

Flat plate test piece 1: a copper plate material (7 mm thick×60 mm long×40 mm wide)
Surface roughness Ra of the sliding surface 0.4 μm
Pin test piece 1: a DLC coating semicylindrical piece (curvature R of 300×30 mm long)
Surface roughness Ra of the sliding surface 0.03 μm Here, the DLC coating semicylindrical piece used as the pin test piece 1 mentioned above was a piece in which a sliding surface of chromium steel steel material (SCr420) was covered with a DLC film by a PVD arc ion-type ion plating method. Note that a content of hydrogen in the DLC film was 0.5 atomic %. Further, a MoDTC-containing oil (a content of Mo: 700 mass ppm; SAE viscosity: 0W20) was used as the lubricating oil.

It was noted from the result of the reciprocal motion test that, in Example 1, a frictional force in the sliding part did not exceed 130 N all the time including the time of the stop by a limiter upon reaching a load capacity of the testing machine of 1900 N.

<Surface Analysis of DLC Film>

Figure 3:
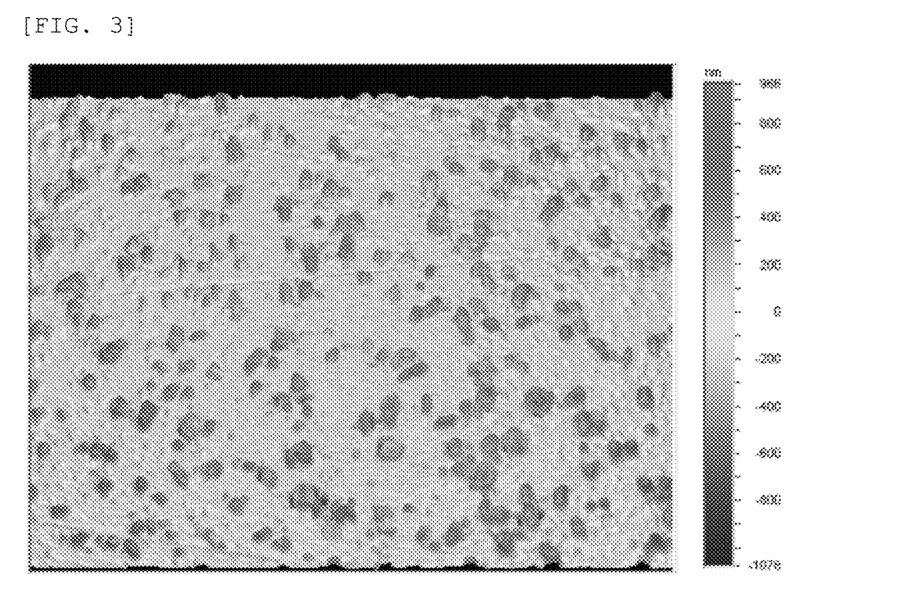
FIG. 3 is an image of a sliding part of pin test piece 1 observed with a cross-sectional scanning electron microscope (SEM) after a reciprocating test.

FIG. 3 is an image of a sliding part of the pin test piece 1 observed with a cross-sectional scanning electron microscope (SEM) after the reciprocal motion test. As shown in FIG. 3, it was observed that a large number of independent spots were formed in an interspersed manner on the surface of the DLC film. These spots were measured by elemental analysis based on a combustion method, and were found to be copper films using copper as a main component. Note that an area ratio of the interspersed copper films as sliding parts in the DLC film was 12%, and a thickness of the interspersed copper film was 0.5 μm.

Example 2

Example 2 was performed by a reciprocal motion test technique similar to that of Example 1 except that a MoDTP-containing oil was used in place of the MoDTC-containing oil as the lubricating oil. In Example 2, a frictional force in the sliding part did not exceed 130 N all the time including the time of the stop by a limiter upon reaching a load capacity of the testing machine of 1900 N.

<Surface Analysis of DLC Film>

An image of a sliding part of the pin test piece 2 was observed with a cross-sectional scanning electron microscope (SEM) after the reciprocal motion test, and it was observed that a large number of independent spots were formed in an interspersed manner on the surface of the DLC film. These spots were measured by elemental analysis based on a combustion method, and were found to be copper films using copper as a main component. Note that an area ratio of the interspersed copper films as sliding parts in the DLC film was 8%, and a thickness of the interspersed copper film was 0.5 μm.

Example 3

Example 3 was performed by a reciprocal motion test technique similar to that of Example 1 except that a MoDTC-containing oil (a content of Mo: 800 mass ppm) was used in place of the MoDTC-containing oil (a content of Mo: 700 mass ppm) as the lubricating oil. In Example 3, although a stop was made by a limiter upon reaching a load capacity of the testing machine of 1900 N, a frictional force in the sliding part did not exceed 130 N.

<Surface Analysis of DLC Film>

An image of a sliding part of the pin test piece 3 was observed with a cross-sectional scanning electron microscope (SEM) after the reciprocal motion test, and it was observed that a large number of independent spots were formed in an interspersed manner on the surface of the DLC film. These spots were measured by elemental analysis based on a combustion method, and were found to be copper films using copper as a main component. Note that an area ratio of the interspersed copper films as sliding parts in the DLC film was 5%, and a thickness of the interspersed copper film was 0.3 μm.

Example 4

Example 4 was performed by a reciprocal motion test technique similar to that of Example 1 except that a MoDTC-containing oil (the content of Mo: 70 ppm) was used in place of the MoDTC-containing oil (the content of Mo: 700 ppm) as the lubricating oil. In Example 4, when a load reached 1700 N, a frictional force in the sliding part exceeded 130 N, to stop the test.

<Surface Analysis of DLC Film>

An image of a sliding part of the pin test piece 4 was observed with a cross-sectional scanning electron microscope (SEM) after the reciprocal motion test, and it was observed that a large number of independent spots were formed in an interspersed manner on the surface of the DLC film. These spots were measured by elemental analysis based on a combustion method, and were found to be copper films using copper as a main component. Note that an area ratio of the interspersed copper films as sliding parts in the DLC film was 0.5%, and a thickness of the interspersed copper film was 0.3 μm.

Example 5

Example 5 was performed by a reciprocal motion test technique similar to that of Example 1 except that a content of hydrogen of the DLC film was changed to 5.0 atomic %. In Example 5, when a load reached 1800 N, a frictional force in the sliding part exceeded 130 N, to stop the test.

<Surface Analysis of DLC Film>

An image of a sliding part of the pin test piece 5 was observed with a cross-sectional scanning electron microscope (SEM) after the reciprocal motion test, and it was observed that a large number of independent spots were formed in an interspersed manner on the surface of the DLC film. These spots were measured by elemental analysis based on a combustion method, and were found to be copper films using copper as a main component. Note that an area ratio of the interspersed copper films as sliding parts in the DLC film was 13%, and a thickness of the interspersed copper film was 0.5 μm.

Example 6

Example 6 was performed by a reciprocal motion test technique similar to that of Example 1 except that a flat plate test piece 6 made of aluminum was used. In Example 6, when a load reached 1900 N, a frictional force in the sliding part exceeded 130 N, to stop the test.

<Surface Analysis of DLC Film>

An image of a sliding part of the pin test piece 6 was observed with a cross-sectional scanning electron microscope (SEM) after the reciprocal motion test, and it was observed that a large number of independent spots were formed in an interspersed manner on the surface of the DLC film. These spots were measured by elemental analysis based on a combustion method, and were found to be copper films using aluminum as a main component. Note that an area ratio of the interspersed aluminum films as sliding parts in the DLC film was 5%, and a thickness of the interspersed aluminum film was 0.3 µm.

Example 7

In Example 7, a large number of independent copper films were formed by a CVD method on a sliding part of a DLC coating semicylindrical piece in advance. Example 7 was performed by a reciprocal motion test technique similar to that of Example 1. In Example 7, a frictional force in the sliding part did not exceed 130 N all the time including the time of the stop by a limiter upon reaching a load capacity of the testing machine of 1900 N.

Example 8

In Example 8, a large number of independent copper films were formed by a CVD method on the sliding part of a DLC coating semicylindrical piece in advance. An area ratio of the large number of such independent copper films as sliding parts in the DLC film was 10%, and a thickness of the independent copper film was 0.5 µm. After that, a test was performed by a reciprocal motion test technique similar to that of Example 1 except that a Mo-less oil was used in place of the MoDTC as the lubricating oil. In Example 8, when a load reached 1800 N, a frictional force in the sliding part exceeded 130 N, to stop the test.

Comparative Example 1

Figure 4:
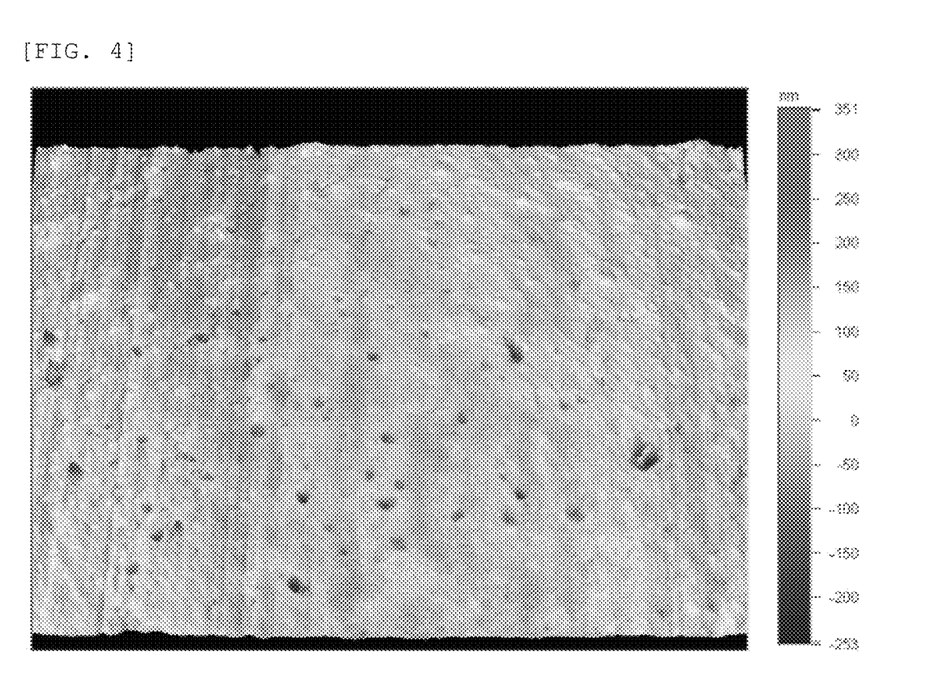
FIG. 4 is an image of a sliding part of pin test piece C1 observed with a cross-sectional scanning electron microscope (SEM) after a reciprocating test

Comparative Example 1 was performed by a reciprocal motion test technique similar to that of Example 1 except that a Mo-less oil was used in place of the MoDTC-containing oil as the lubricating oil. In Comparative Example 1, when a load reached 1500 N, a frictional force in the sliding part exceeded 130 N, to stop the test.
<Surface Analysis of DLC Film>
After the reciprocal motion test mentioned above, the sliding part of the pin test piece C1 was observed with a cross-sectional scanning electron microscope (SEM); however, as shown in FIG. 4, there were very few spots on the surface of the DLC film.

Comparative Example 2

Comparative Example 2 was performed by a reciprocal motion test technique similar to that of Example 1 except that pin test piece C2 was not covered with a DLC film. In Comparative Example 2, when a load reached 500 N, a frictional force in the sliding part exceeded 130 N, to stop the test.
<Surface Analysis of DLC Film>
After the reciprocal motion test mentioned above, the sliding part of the pin test piece C2 was observed with a cross-sectional scanning electron microscope (SEM); however, there were very few spots on the surface of the DLC film.

Comparative Example 3

Comparative Example 3 was performed by a reciprocal motion test technique similar to that of Example 6 except that a Mo-less oil was used in place of the MoDTC-containing oil as the lubricating oil. In Comparative Example 3, when a load reached 1600 N, a frictional force in the sliding part exceeded 130 N, to stop the test.
<Surface Analysis of DLC Film>
After the reciprocal motion test mentioned above, the sliding part of the pin test piece C3 was observed with a cross-sectional scanning electron microscope (SEM); however, there were very few spots on the surface of the DLC film.

The conditions and the evaluation results of Examples 1 to 7 and Comparative Examples 1 to 3 mentioned above are shown in Table 1 below.

TABLE 1

| | Content of hydrogen of DLC film (atomic %) | Metal film | | | Lubricating oil | | Seizure load (N) |
| --- | --- | --- | --- | --- | --- | --- | --- |
| | | Kind | Area ratio (%) | Thickness (µm) | Kind | Content of Mo (ppm) | |
| Example 1 | 0.5 | Copper | 12 | 0.5 | MoDTC-containing oil | 700 | More than 1900 |
| Example 2 | 0.5 | Copper | 8 | 0.5 | MoDTP-containing oil | 700 | More than 1900 |
| Example 3 | 0.5 | Copper | 5 | 0.3 | MoDTC-containing oil | 800 | More than 1900 |
| Example 4 | 0.5 | Copper | 0.5 | 0.3 | MoDTC-containing oil | 70 | 1700 |
| Example 5 | 5.0 | Copper | 13 | 0.5 | MoDTC-containing oil | 700 | 1800 |
| Example 6 | 0.5 | Aluminum | 5 | 0.3 | MoDTC-containing oil | 700 | 1900 |
| Example 7 | 0.5 | Copper (CVD method) | 10 | 0.5 | MoDTC-containing oil | 700 | More than 1900 |
| Example 8 | 0.5 | Copper (CVD method) | 10 | 0.5 | MoDTC-less oil | — | 1800 |
| Comparative Example 1 | 0.5 | Copper film was not formed | — | — | Mo-less oil | — | 1500 |
| Comparative Example 2 | 5.0 | Copper film was not formed | — | — | Mo-less oil | — | 1500 |
| Comparative Example 3 | 0.5 | Aluminum film was not formed | — | — | Mo-less oil | — | 1600 |

—: less than or equal to detection limit

Since in Examples 1 to 8, the pin test piece was covered with a DLC film, and independent metal films were arranged in an interspersed manner on the DLC film, friction was lessened in the reciprocal motion test, and good seizure resistance performance was exhibited. On the other hand, since in Comparative Examples 1 to 3, a reciprocal motion test was performed using the pin test piece in which a DLC film was not covered with metal films, it has been found that, in all of the Comparative Examples, frictional force is large, and seizure resistance performance is poor.

REFERENCE SIGNS LIST

20 Flat plate test piece (corresponding to sliding member (B))
21 Pin test piece (corresponding to DLC coating sliding member (A))
10 Sliding mechanism
100 DLC coating sliding member (A)
110 Base material
120 DLC film
130 Metal film

The invention claimed is:

1. A sliding mechanism comprising:
   a DLC coating sliding member (A) having a DLC film covered on a base material;
   a sliding member (B); and
   a lubricating oil interposed at a sliding surface between the DLC coating sliding member (A) and the sliding member (B), wherein
   metal films are independently interspersed as convex parts on a surface of the DLC film of the DLC coating sliding member (A).

2. The sliding mechanism according to claim 1, wherein the metal film is a metal film having as a main component at least one metal selected from the group consisting of copper, aluminum, iron, or tin.

3. The sliding mechanism according to claim 1, wherein a constituent material of the sliding member (B) has as a main component at least one metal selected from the group consisting of copper, aluminum, iron, or tin.

4. The sliding mechanism according to claim 1, wherein the lubricating oil contains a molybdenum-containing compound.

5. The sliding mechanism according to claim 4, wherein a content of molybdenum in the lubricating oil is more than or equal to 500 mass ppm.

6. The sliding mechanism according to claim 1, wherein an area ratio of the metal films on the DLC film is more than or equal to 5% and less than or equal to 30%.

7. The sliding mechanism according to claim 1, wherein a thickness of the metal film is more than or equal to 0.1 μm and less than or equal to 10 μm.

8. The sliding mechanism according to claim 1, wherein a content of hydrogen in the DLC film is less than or equal to 5 atomic %.

* * * * *